(12) United States Patent
Sakamoto et al.

(10) Patent No.: US 7,513,269 B2
(45) Date of Patent: Apr. 7, 2009

(54) HYDRAULIC CONTROL SYSTEM FOR AUTOMATIC TRANSMISSION

(75) Inventors: Osamu Sakamoto, Handa (JP); Kiyoharu Takagi, Okazaki (JP)

(73) Assignee: Aisin Seiki Kabushiki Kaisha, Kariya, Aichi-Ken (JP)

( * ) Notice: Subject to any disclaimer, the term of this patent is extended or adjusted under 35 U.S.C. 154(b) by 605 days.

(21) Appl. No.: 11/353,203

(22) Filed: Feb. 14, 2006

(65) Prior Publication Data

US 2006/0191574 A1     Aug. 31, 2006

(30) Foreign Application Priority Data

Feb. 15, 2005    (JP) .............................. 2005-037062

(51) Int. Cl.
*F16K 15/00* (2006.01)
(52) U.S. Cl. ............. 137/455; 137/115.19; 137/115.23; 137/492.5; 60/413
(58) Field of Classification Search ................. 137/455, 137/485, 492.5, 115.19, 115.23; 60/413, 60/416
See application file for complete search history.

(56) References Cited

U.S. PATENT DOCUMENTS

| | | | | |
|---|---|---|---|---|
| 4,461,937 A | * | 7/1984 | Boni | ........................ 200/82 B |
| 4,779,936 A | * | 10/1988 | Farr | ......................... 303/116.4 |
| 5,601,506 A | | 2/1997 | Long et al. | |
| 6,471,613 B1 | | 10/2002 | Botosan et al. | |
| 6,537,170 B2 | | 3/2003 | Murasugi et al. | |
| 7,204,266 B2 | * | 4/2007 | Krenzer et al. | ......... 137/115.19 |

FOREIGN PATENT DOCUMENTS

| | | |
|---|---|---|
| JP | 2925505 | 5/1999 |
| JP | 2002-89671 | 3/2002 |
| JP | 2003-97690 | 4/2003 |

* cited by examiner

*Primary Examiner*—Kevin L Lee
(74) *Attorney, Agent, or Firm*—Buchanan Ingersoll & Rooney PC

(57) ABSTRACT

In a hydraulic control system for an automatic transmission, a valve element of an accumulator closes communication between a pressure switch circuit and a detection circuit when a hydraulic pressure applied to the detection circuit is lower than a predetermined hydraulic pressure, and opens communication between the pressure switch circuit and the detection circuit when the applied pressure is higher than or equal to the predetermined hydraulic pressure. A switching element opens communication between one end of the pressure switch circuit and an exhaust circuit when the other end of the pressure switch circuit does not communicate with the detection circuit, and closes communication between the one end and the exhaust circuit when the other end communicates with the detection circuit.

14 Claims, 8 Drawing Sheets

HYDRAULIC CONTROL SYSTEM FOR AUTOMATIC TRANSMISSION

CROSS REFERENCES TO RELATED APPLICATIONS

This application is based on and claims priority under 35 U.S.C. §119 with respect to Japanese Patent Application No. 2005-037062 filed on Feb. 15, 2005, the entire content of which is incorporated herein by reference.

BACKGROUND OF THE INVENTION

1. Field of the Invention

The present invention relates to a hydraulic control system for an automatic transmission, and more particularly, to a hydraulic control system that can enhance the responsiveness of a pressure switch while preventing the pressure switch from on/off hunting due to hydraulic vibration.

2. Description of the Related Art

A hydraulic control system for an automatic transmission disclosed in Japanese Patent No. 2925505 includes a pressure switch that detects the hydraulic pressure produced in a hydraulic circuit. In this system, on/off hunting of the pressure switch occurs because of hydraulic vibration (turning-on and -off due to irregular vibration), and this reduces the durability of the pressure switch.

Accordingly, Japanese Unexamined Patent Application Publication No. 2002-89671 discloses that unstable hydraulic-pressure detection signals output from the pressure switch because of hydraulic vibration are removed by the timer setting. However, precise and stable hydraulic-pressure detection signals can be obtained only after hydraulic vibration subsides, and this increases the detection time.

In a control system disclosed in Japanese Unexamined Patent Application Publication No. 2003-97690, the line pressure is reduced and is then used as a supply pressure for a pressure switch, and a valve is provided between the supply pressure and the pressure switch to prevent the pressure switch from being affected by hydraulic vibration. In this structure, however, when the valve between the supply pressure and the pressure switch sticks, the pressure switch does not operate. Therefore, the system is not suitable for popular use, and the cost thereof increases.

FIG. 8 shows a known hydraulic control system 101 for an automatic transmission. In the hydraulic control system 101, an orifice 108 and an accumulator 102 for reducing hydraulic vibration are provided to prevent on/off hunting of a pressure switch 103. For example, a transmission with a variable line pressure disclosed in U.S. Pat. No. 6,471,613 adopts a pressure switch and an accumulator.

The pressure switch is used for fail-safe purpose, and therefore, is required to have high responsiveness. However, the responsiveness of the pressure switch is lowered by the orifice and the accumulator, and there is not sufficient time in the event of failure (during a non-operation state).

SUMMARY OF THE INVENTION

Accordingly, it is an object of the present invention to enhance the responsiveness of a pressure switch while preventing on/off hunting of the pressure switch due to hydraulic vibration.

A hydraulic control system for an automatic transmission according to a first aspect of the present invention includes a detection circuit serving as a part of a hydraulic circuit to detect a hydraulic pressure; an accumulator including a casing, a valve element slidably disposed in the casing, and a spring for biasing the valve element, the valve element dividing the inside of the casing into a first space that is free from the spring and communicates with the detection circuit and a second space that houses the spring and communicates with an exhaust circuit; a pressure switch for detecting the hydraulic pressure; a pressure switch circuit connected to the pressure switch, and connected to a slide section of the casing so as to communicate with the first space at one end; and a switching element that communicates with the other end of the pressure switch circuit and the exhaust circuit. The valve element closes communication between the pressure switch circuit and the detection circuit when a hydraulic pressure applied to the detection circuit is lower than a predetermined hydraulic pressure, and opens communication between the pressure switch circuit and the detection circuit when the hydraulic pressure applied to the detection circuit is higher than or equal to the predetermined hydraulic pressure. The switching element opens communication between the other end of the pressure switch circuit and the exhaust circuit when the one end of the pressure switch circuit does not communicate with the detection circuit, and closes communication between the other end and the exhaust circuit when the one end communicates with the detection circuit.

A hydraulic control system for an automatic transmission according to a second aspect of the present invention includes a detection circuit serving as a part of a hydraulic circuit to detect a hydraulic pressure; an accumulator including a casing, a valve element slidably disposed in the casing, and a spring for biasing the valve element, the valve element dividing the inside of the casing into a first space that is free from the spring and communicates with the detection circuit and a second space that houses the spring and communicates with an exhaust circuit; a pressure switch for detecting the hydraulic pressure; and a pressure switch circuit connected to the pressure switch, and connected to a slide section of the casing so as to communicate with the first space at one end and with the second space at the other end. The valve element opens communication between the pressure switch circuit and the exhaust circuit when a hydraulic pressure applied to the detection circuit is lower than a predetermined hydraulic pressure, closes communication of the pressure switch circuit with the detection circuit and the exhaust circuit when the hydraulic pressure applied to the detection circuit is equal to the predetermined hydraulic pressure, and opens communication between the pressure switch circuit and the detection circuit when the hydraulic pressure applied to the detection circuit is higher than the predetermined hydraulic pressure.

A hydraulic control system for an automatic transmission according to a third aspect of the present invention includes a detection circuit serving as a part of a hydraulic circuit to detect a hydraulic pressure; an accumulator including a casing, a valve element slidably disposed in the casing, and a spring for biasing the valve element, the valve element dividing the inside of the casing into a first space that is free from the spring and communicates with the detection circuit and a second space that houses the spring and communicates with an exhaust circuit; a pressure switch for detecting the hydraulic pressure; a pressure switch circuit connected to the pressure switch, and connected to a slide section of the casing so as to communicate with the first space at one end; and a check valve that communicates with the other end of the pressure switch circuit, the detection circuit, and the exhaust circuit. The valve element opens communication between the pressure switch circuit and the exhaust circuit when a hydraulic pressure applied to the detection circuit is lower than a predetermined hydraulic pressure, and opens communication between the pressure switch circuit and the detection circuit when the hydraulic pressure applied to the detection circuit is higher than or equal to the predetermined hydraulic pressure. The check valve opens communication between the other end of the pressure switch circuit and the exhaust circuit and closes communication between the other end and the detection circuit when the one end of the pressure switch circuit does not communicate with the detection circuit, and closes communication between the other end and the exhaust circuit and opens communication between the other end and the detection circuit when the one end communicates with the detection circuit.

According to the present invention, since the pressure switch is turned on after the accumulator starts operation, hunting of the pressure switch due to hydraulic vibration can be prevented without using an orifice.

The accumulator generally has a diameter and a pressure-receiving area larger than those of the valve, and this is advantageous to sticking.

Even when hydraulic control is disabled by failure of an electronic component, the hydraulic pressure can be slowly increased by the operation of the accumulator, and shock caused at the speed change can be reduced.

While the operating pressure of the pressure switch is conventionally determined by the specifications thereof, the lowest hydraulic pressure that is applied to the detection circuit can be changed by simply changing the setting of the spring of the accumulator in the configuration of the present invention. Therefore, a plurality of operating pressures can be set for a single pressure switch.

DESCRIPTION OF THE PREFERRED EMBODIMENTS

First Embodiment

Figure 1:
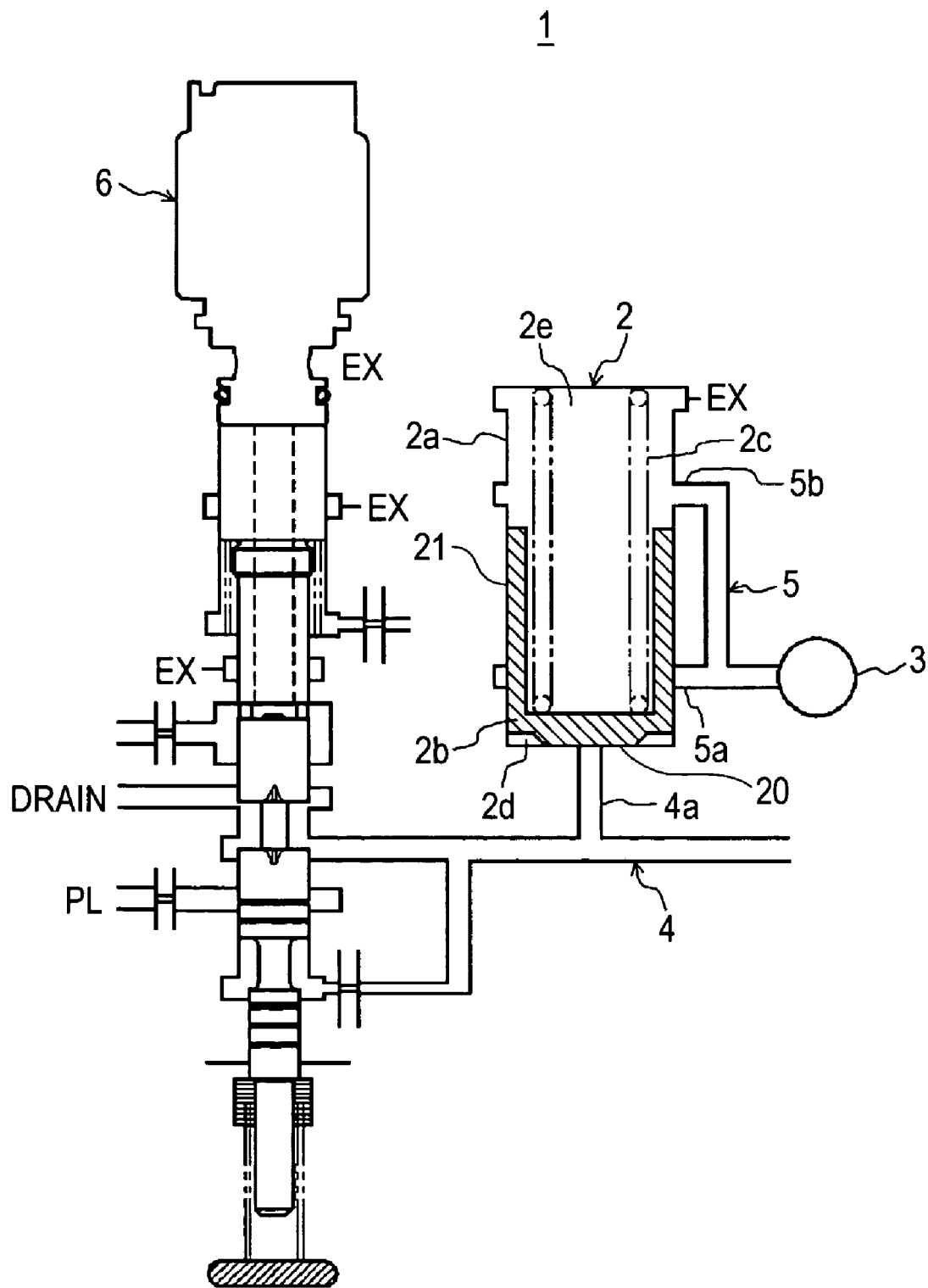
FIG. 1 is a hydraulic circuit diagram schematically showing the configuration of a hydraulic control system for an automatic transmission according to a first embodiment of the present invention, the hydraulic control system being placed in a first state.
Figure 2:
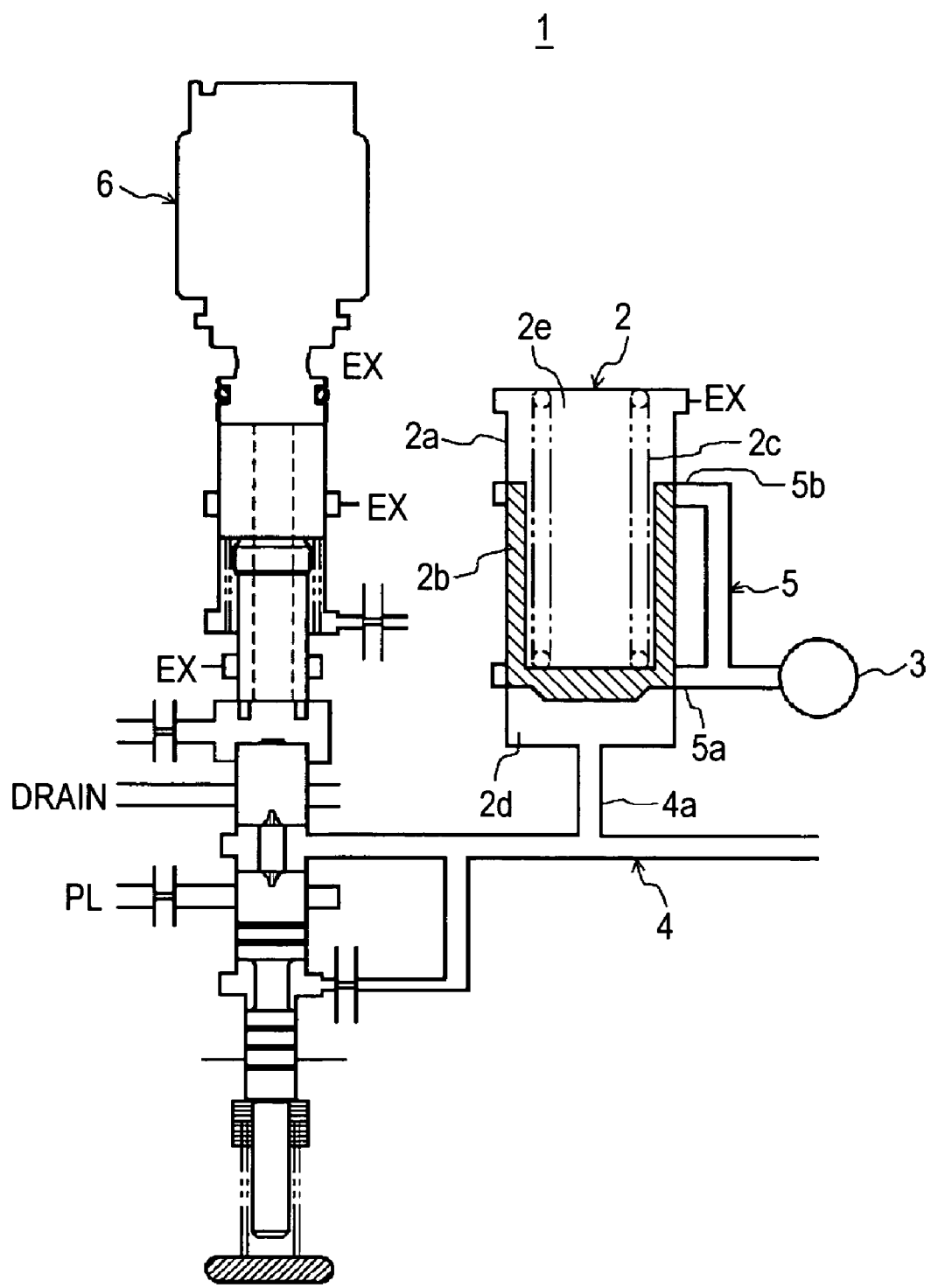
FIG. 2 is a hydraulic circuit diagram of the hydraulic control system placed in a second state.
Figure 3:
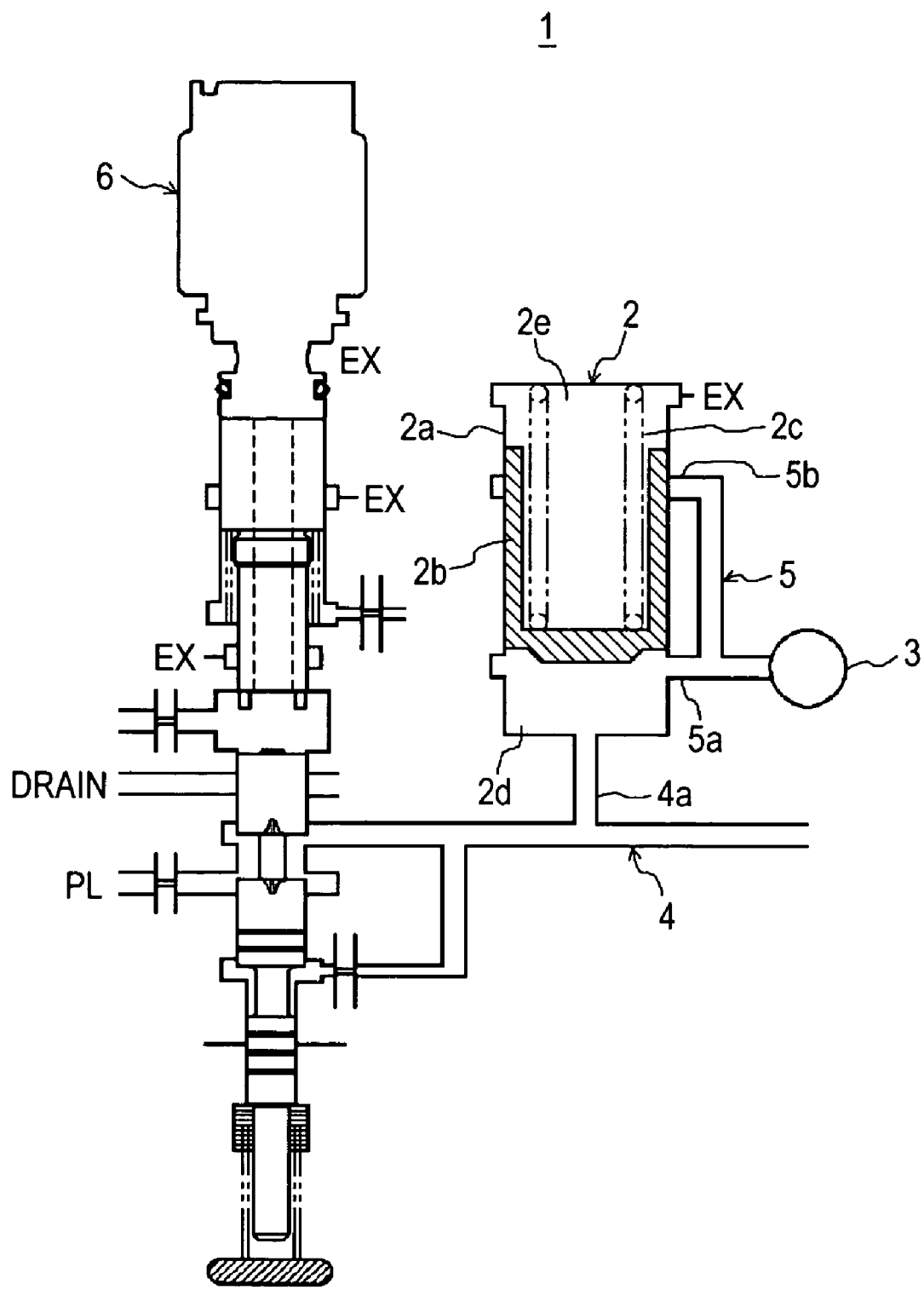
FIG. 3 is a hydraulic circuit diagram of the hydraulic control system placed in a third state.

A hydraulic control system for an automatic transmission according to a first embodiment of the present invention will be described with reference to the drawings. FIGS. 1 to 3 are hydraulic circuit diagrams schematically showing the configuration of a part of the hydraulic control system of the first embodiment. FIG. 1 shows a state in which a hydraulic pressure applied to a detection circuit is lower than a predetermined pressure and a pressure switch circuit communicates with an exhaust circuit. FIG. 2 shows a state in which the predetermined hydraulic pressure is applied to the detection circuit, an accumulator starts operation, and the pressure switch circuit does not communicate with the exhaust circuit. FIG. 3 shows a state in which the pressure switch circuit communicates with the detection circuit, and a pressure switch is in operation.

A hydraulic control system 1 of the first embodiment hydraulically controls the gear ratio of a planetary gear unit (not shown) in a manual or automatic manner, and hydraulically controls the torque change of an output shaft of an automatic transmission so that an undesirable shock is not caused during speed change. The hydraulic control system 1 includes an accumulator 2, a pressure switch 3, a detection circuit 4, and a pressure switch circuit 5.

The accumulator 2 reduces hydraulic shock given to the detection circuit 4 by the operation of, for example, an oil pump (not shown) and a valve such as a linear solenoid valve 6. The accumulator 2 includes a casing 2a, a valve element 2b, and a spring 2c. The casing 2a is connected to one end 5a and the other end 5b of the pressure switch circuit 5 at a slide section where the valve element 2b slides relative to the casing 2a. The valve element 2b includes a disc-shaped head portion 20 and a cylindrical body portion 21. A space provided on one side of the valve element 2b remote from the spring 2c in the casing 2a serves as a first space 2d, and can communicate with the detection circuit 4 via a port 4a. A space provided on the other side of the valve element 2b adjacent to the spring 2c serves as a second space 2e, and can communicate with an exhaust circuit EX. The exhaust circuit EX is a circuit (passage) communicating with the low-pressure side such as the ambient pressure side. The valve element 2b is slidably disposed inside the casing 2a. The valve element 2b opens communication between the pressure switch circuit 5 and the exhaust circuit EX when a hydraulic pressure applied to the detection circuit 4 is lower than a predetermined pressure (see FIG. 1), closes communication of the pressure switch circuit 5 with the detection circuit 4 and the exhaust circuit EX by closing the pressure switch circuit 5 with the body portion 21 when the predetermined hydraulic pressure is applied to the detection circuit 4 (see FIG. 2), and opens communication between the pressure switch circuit 5 and the detection circuit 4 when the hydraulic pressure applied to the detection circuit 4 is higher than the predetermined hydraulic pressure (see FIG. 3). The spring 2c biases the valve element 2b toward the port 4a inside the casing 2a.

The pressure switch 3 detects the hydraulic pressure produced in the detection circuit 4, and is connected to the pressure switch circuit 5.

The detection circuit 4 is a part of the hydraulic circuit (oil passage) that detects the hydraulic pressure. The detection circuit 4 can communicate with the casing 2a (first space 2d) of the accumulator 2 via the port 4a, and also with a planetary gear unit (not shown) and the linear solenoid valve 6.

Figure 4:
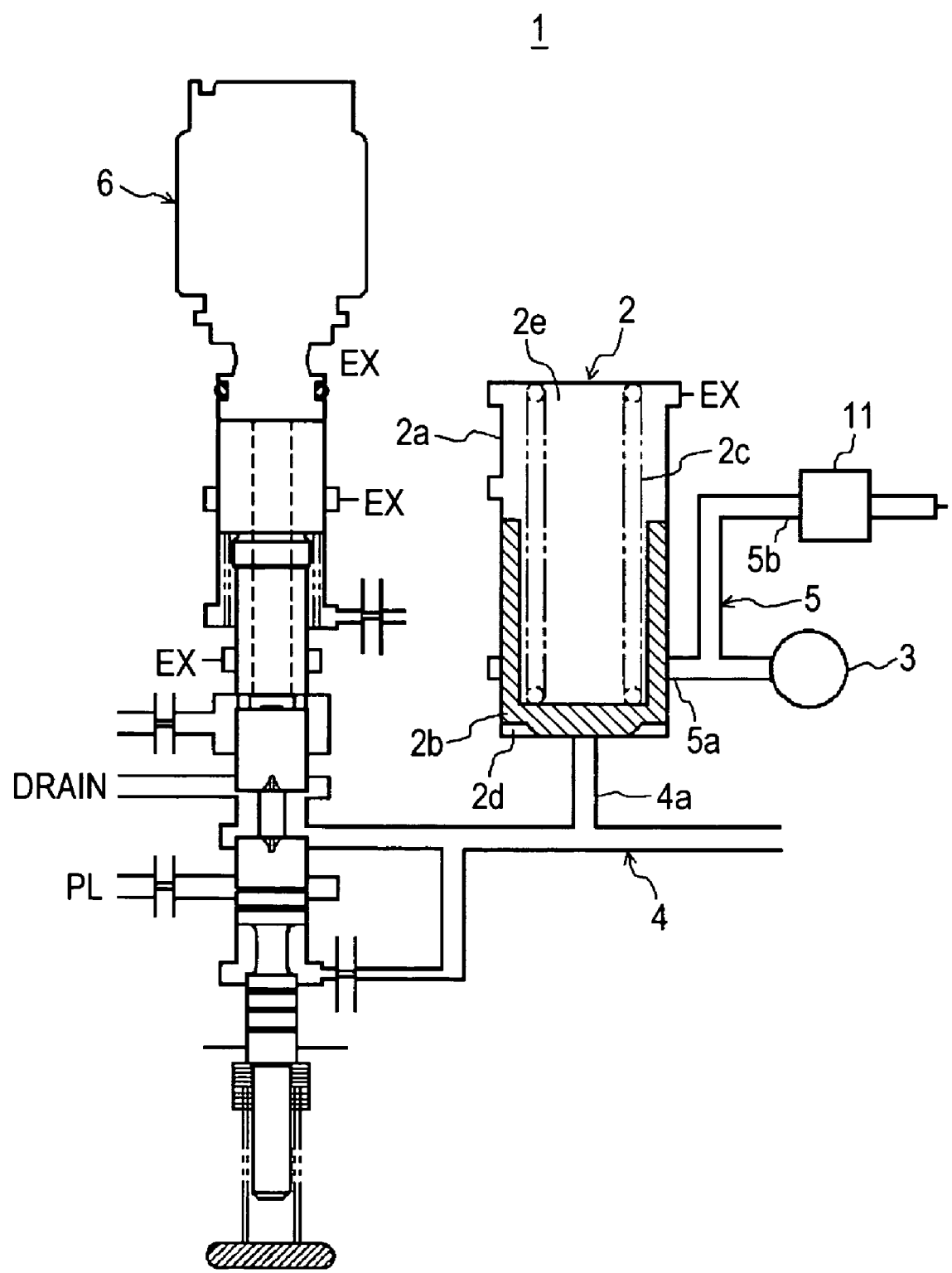
FIG. 4 is a hydraulic circuit diagram schematically showing the configuration of a first modification of the hydraulic control system of the first embodiment.
Figure 5:
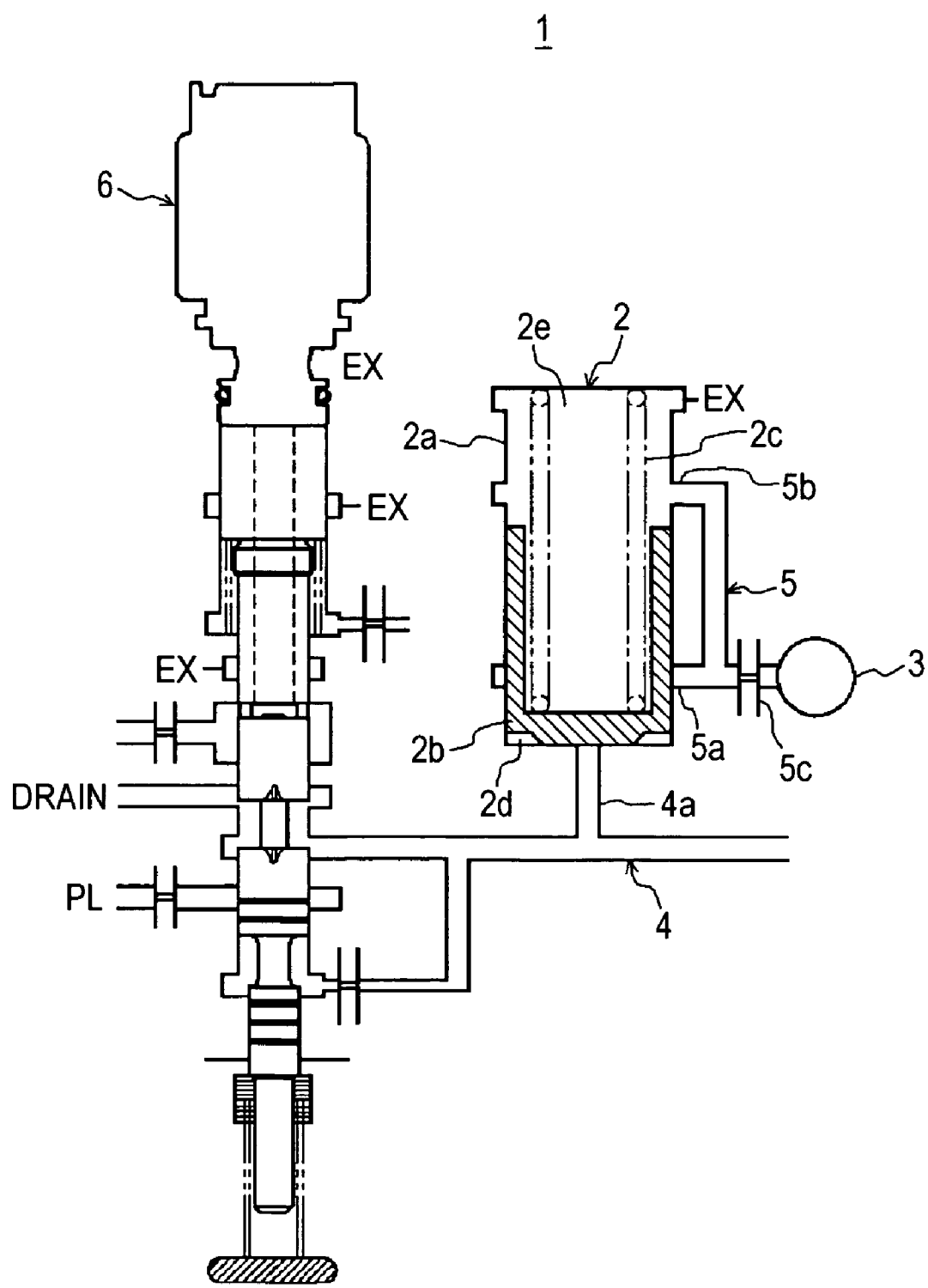
FIG. 5 is a hydraulic circuit diagram schematically showing the configuration of a second modification of the hydraulic control system of the first embodiment.

The pressure switch circuit 5 is a circuit (oil passage) connected to the casing 2a of the accumulator 2 and the pressure switch 3. One end 5a of the pressure switch circuit 5 is connected to the slide section of the casing 2a at a position adjacent to the first space 2d, and is allowed by the action of the valve element 2b to communicate with the detection circuit 4. The other end 5b of the pressure switch circuit 5 is connected to the slide section of the casing 2a at a position adjacent to the second space 2e, and is allowed by the action of the valve element 2b to communicate with the exhaust circuit EX. While the other end 5b is connected to the slide section in FIG. 1, a switching element 11 (e.g., a valve) may be provided to open communication between the other end 5b and the exhaust circuit EX when the one end 5a of the pressure switch circuit 5 does not communicate with the detection circuit 4, and to close communication between the other end 5b and the exhaust circuit EX when the one end 5a communicates with the detection circuit 4, as shown in FIG. 4. Alternatively, an orifice 5c may be provided at any position in the pressure switch circuit 5, as shown in FIG. 5.

The linear solenoid valve 6 outputs the pressure adjusted in accordance with the applied current by utilizing a line pressure PL. The linear solenoid valve 6 outputs the maximum adjusted pressure when no current is applied. When a current is applied, the adjusted pressure output from the linear solenoid valve 6 decreases as the applied current increases. The line pressure PL is a discharge pressure from an oil pump (not shown). Hydraulic pressure is discharged from a drain to a low-pressure preload circuit (not shown).

The operation of the hydraulic control system 1 for the automatic transmission according to the first embodiment will now be described.

In a state in which a hydraulic pressure applied to the detection circuit 4 is lower than a predetermined hydraulic pressure (the accumulator 2 is out of operation), communication between the detection circuit 4 and the pressure switch circuit 5 is closed by the valve element 2b of the accumulator 2, and the pressure switch circuit 5 communicates with the exhaust circuit EX, as shown in FIG. 1. Therefore, the pressure switch 3 does not operate.

When the predetermined hydraulic pressure determined by the setting of the spring 2c of the accumulator 2 is applied to the detection circuit 4, the valve element 2b starts operation (sliding), and communication between the pressure switch circuit 5 and the exhaust circuit EX is closed, as shown in FIG. 2. When the hydraulic pressure applied to the detection circuit 4 exceeds the predetermined hydraulic pressure, and the valve element 2b further moves (slides), the detection circuit 4 communicates with the pressure switch circuit 5 via the accumulator 2, as shown in FIG. 3. The hydraulic pressure applied to the detection circuit 4 is also applied to the pressure switch 3, and consequently, the pressure switch 3 is operated.

According to the above-described first embodiment, since the pressure switch 3 is operated after the accumulator 2 starts operation, it can be prevented from hunting due to hydraulic vibration, without using an orifice. Further, the accumulator 2 generally has a diameter and a pressure-receiving area larger than those of the valve, and this is advantageous to sticking. Even when hydraulic control is disabled by failure of an electronic component (e.g., a solenoid or a controller), the hydraulic pressure can be slowly increased by the operation of the accumulator 2. Therefore, the shock caused at the speed change can be reduced. While the operating pressure of the pressure switch is conventionally determined by the specifications thereof, the lowest hydraulic pressure that is applied to the detection circuit 4 can be changed by simply changing the setting of the spring 2c of the accumulator 2 in the configuration of the first embodiment. Accordingly, a plurality of operating pressures can be set for the single pressure switch 3.

Second Embodiment

Figure 6:
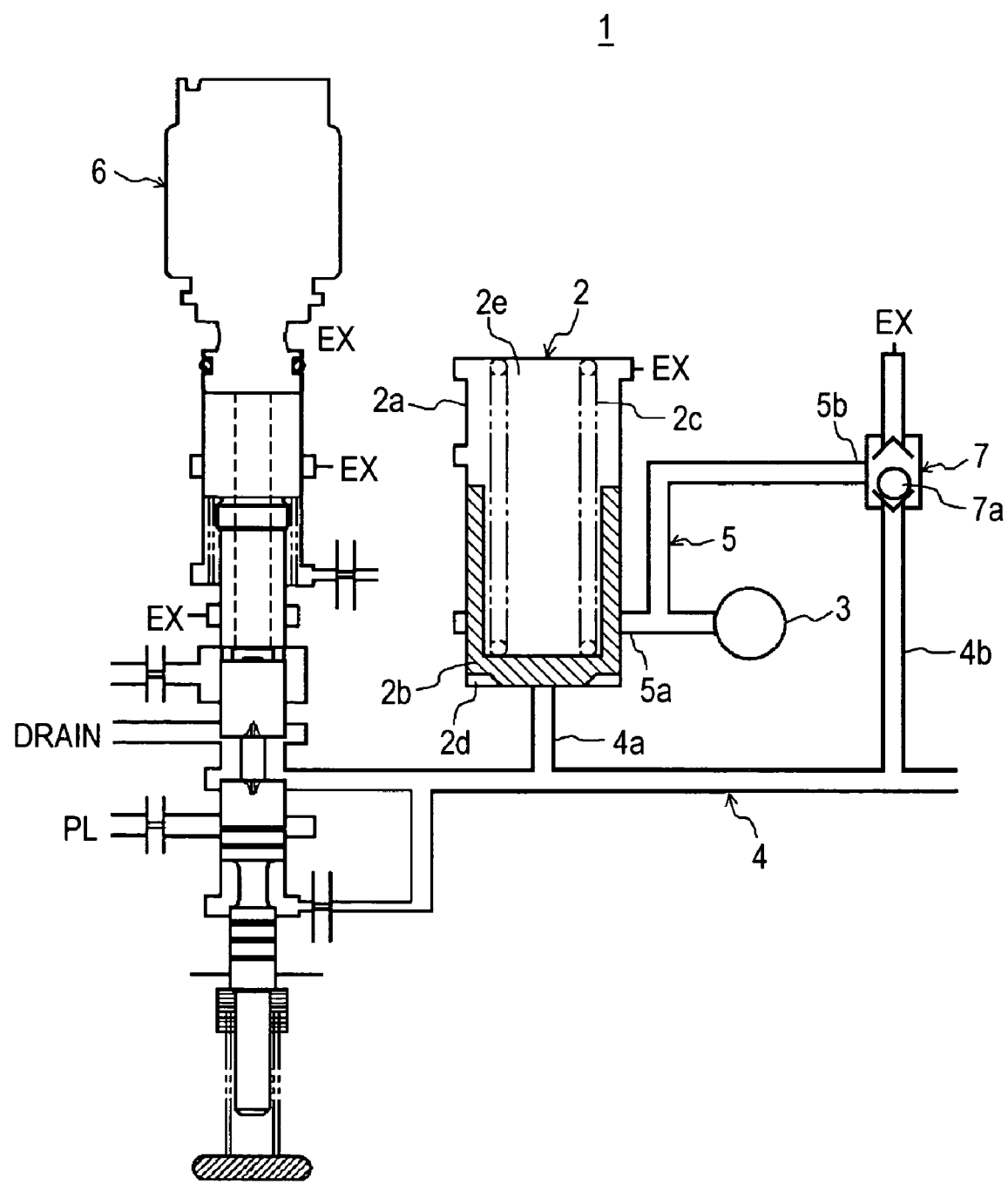
FIG. 6 is a hydraulic circuit diagram schematically showing the configuration of a hydraulic control system for an automatic transmission according to a second embodiment of the present invention, the hydraulic control system being placed in a first state.
Figure 7:
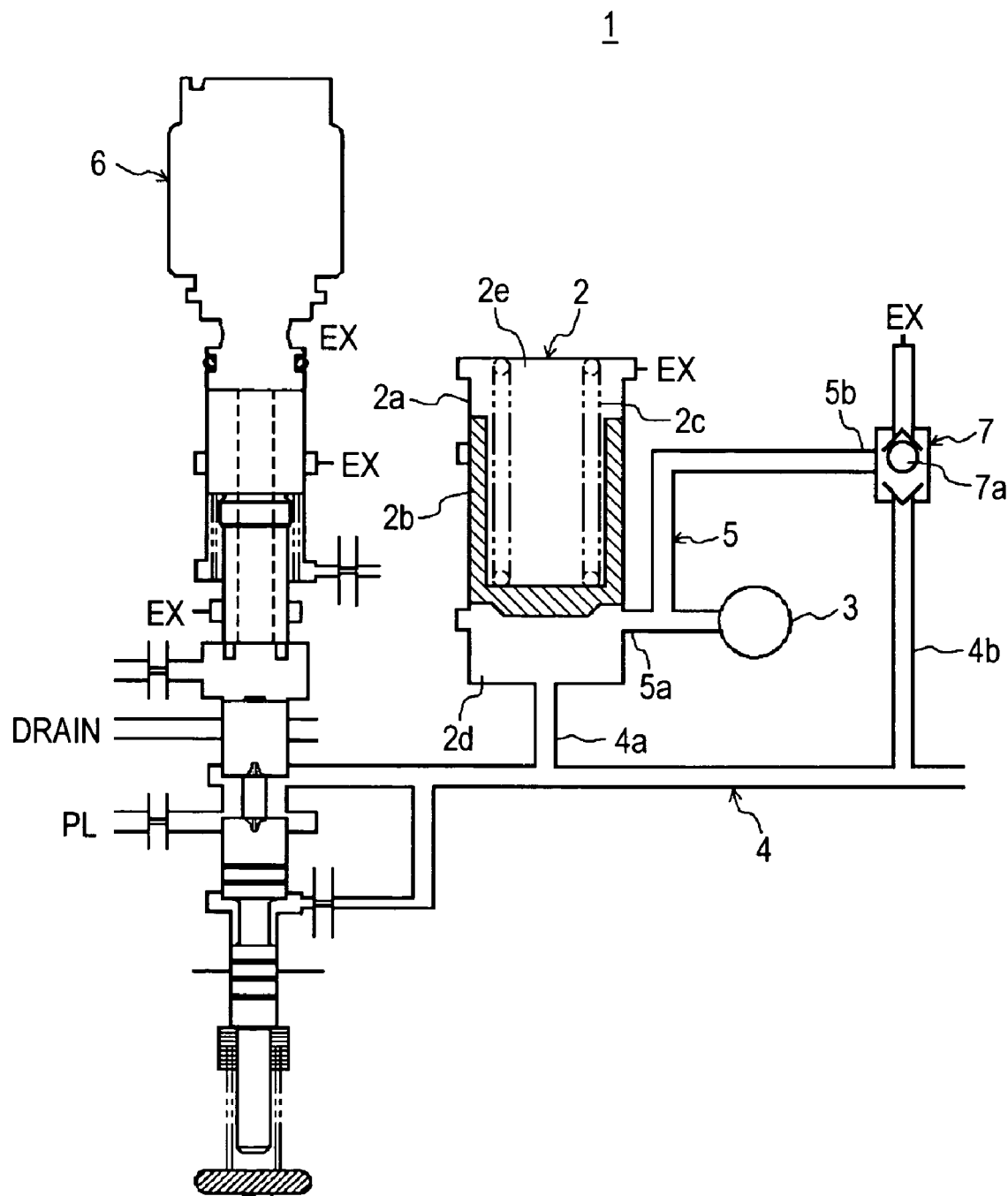
FIG. 7 is a hydraulic circuit diagram of the hydraulic control system placed in a second state.
Figure 8:
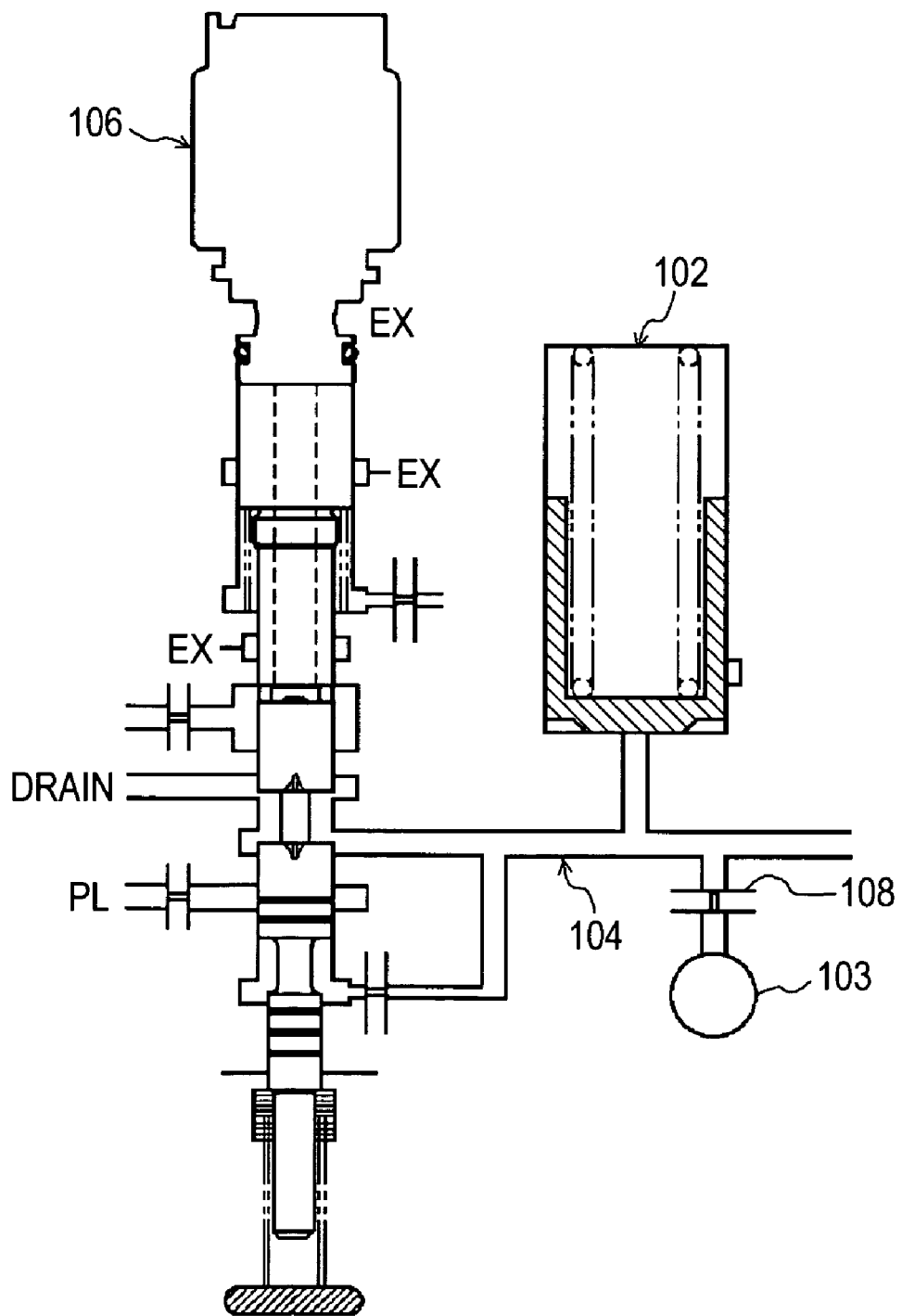
FIG. 8 is a hydraulic circuit diagram schematically showing the configuration of a known hydraulic control system for an automatic transmission.

A hydraulic control system for an automatic transmission according to a second embodiment of the present invention will now be described with reference to FIGS. 6 and 7. FIGS. 6 and 7 are hydraulic circuit diagrams schematically showing the configuration of a part of the hydraulic control system according to the second embodiment. FIG. 6 shows a state in which a hydraulic pressure applied to a detection circuit is lower than a predetermined hydraulic pressure and in which a pressure switch circuit communicates with an exhaust circuit. FIG. 7 shows a state in which the pressure switch circuit communicates with the detection circuit and in which a pressure switch is in operation.

A hydraulic control system 1 of the second embodiment includes an accumulator 2, a pressure switch 3, a detection circuit 4, a pressure switch circuit 5, and a check valve 7.

The accumulator 2 includes a casing 2a, a valve element 2b, and a spring 2c. A space in the casing 2a (first space 2d) remote from the spring 2c is allowed to communicate with the detection circuit 4 via a port 4a. The casing 2a is connected to one end 5a of the pressure switch circuit 5 at a slide section where the valve element 2b slides relative to the casing 2a, but is not connected to the other end 5b of the pressure switch circuit 5. A space in the casing 2a (second space 2e) adjacent to the spring 2c is connected to an exhaust circuit EX. The valve element 2b is slidably disposed inside the casing 2a. The valve element 2b closes communication between the pressure switch circuit 5 and the detection circuit 4 when a hydraulic pressure applied to the detection circuit 4 is lower than a predetermined hydraulic pressure, as shown in FIG. 6, and opens communication between the pressure switch circuit 5 and the detection circuit 4 when the hydraulic pressure applied to the detection circuit 4 is higher than or equal to the predetermined pressure, as shown in FIG. 7. The spring 2c biases the valve element 2b toward the port 4a inside the casing 2a.

The pressure switch 3 detects the hydraulic pressure produced in the detection circuit 4, and is connected to the pressure switch circuit 5.

The detection circuit 4 is allowed to communicate with the casing 2a (first space 2d) of the accumulator 2 via the port 4a, and is connected to the check valve 7 via a port 4b.

The pressure switch circuit 5 is a circuit (oil passage) connected to the casing 2a of the accumulator 2 and to the pressure switch 3. One end 5a of the pressure switch circuit 5 is connected to the slide section of the casing 2a (where the valve element 2b slides relative to the casing 2a) at a position adjacent to the first space 2d, and is allowed by the action of the valve element 2b to communicate with the detection circuit 4. The other end 5b of the pressure switch circuit 5 is connected to the check valve 7, and is selectively allowed by the operation of the check valve 7 to communicate with the exhaust circuit EX or the detection circuit 4.

The check valve 7 is a directional control valve that determines the direction in which the fluid flows. The check valve 7 is connected to the other end 5b of the pressure switch circuit 5, the port 4b of the detection circuit 4, and the exhaust circuit EX. When the hydraulic pressure applied to the detection circuit 4 is lower than a predetermined hydraulic pressure, the check valve 7 opens communication between the pressure switch circuit 5 and the exhaust circuit EX, and closes communication between the pressure switch circuit 5 and the detection circuit 4 by means of a ball 7a, as shown in FIG. 6. In contrast, when the hydraulic pressure applied to the detection circuit 4 is higher than or equal to the predetermined hydraulic pressure, the check valve 7 opens communication between the pressure switch circuit 5 and the detection circuit 4, and closes communication between the pressure switch circuit 5 and the exhaust circuit EX by means of the ball 7a, as shown in FIG. 7.

The operation of the hydraulic control system 1 for an automatic transmission according to the second embodiment will now be described.

In a state in which the hydraulic pressure applied to the detection circuit 4 is lower than a predetermined hydraulic pressure (the accumulator 2 is out of operation), communication between the pressure switch circuit 5 and the detection circuit 4 is closed by the valve element 2b of the accumulator 2 and the check valve 7, and the pressure switch circuit 5 communicates with the exhaust circuit EX via the check valve 7, as shown in FIG. 6. Therefore, the pressure switch 3 does not operate.

When the hydraulic pressure applied to the detection circuit 4 is higher than or equal to the predetermined hydraulic pressure, the valve element 2b moves (slides), and communication between the pressure switch circuit 5 and the exhaust circuit EX is closed by the check valve 7, and the pressure switch circuit 5 communicates with the detection circuit 4 via the accumulator 2 and the check valve 7, as shown in FIG. 7. The hydraulic pressure applied to the detection circuit 4 is also applied to the pressure switch 3, and consequently, the pressure switch 3 is operated.

The second embodiment provides advantages similar to those of the first embodiment.

While the linear solenoid valve 6 outputs the maximum adjusted pressure in the no-current state in the above-described first and second embodiments, it may output the minimum adjusted value in that state. This is different only in the method for controlling the application of the current, and is also applicable to the present invention.

What is claimed is:

1. A hydraulic control system for an automatic transmission, comprising:
   a detection circuit serving as a part of a hydraulic circuit to detect a hydraulic pressure;
   an accumulator including a casing, a valve element slidably disposed in the casing, and a spring for biasing the valve element, the valve element dividing the inside of the casing into a first space that communicates with the detection circuit and a second space that houses the spring and communicates with an exhaust circuit;
   a pressure switch for detecting the hydraulic pressure; and
   a pressure switch circuit connected to the pressure switch, and connected to a slide section of the casing so as to communicate with the first space at one end and with the second space at the other end,
   wherein the valve element opens communication between the pressure switch circuit and the exhaust circuit when a hydraulic pressure applied to the detection circuit is lower than a predetermined hydraulic pressure, closes communication of the pressure switch circuit with the detection circuit and the exhaust circuit when the hydraulic pressure applied to the detection circuit is equal to the predetermined hydraulic pressure, and opens communication between the pressure switch circuit and the detection circuit when the hydraulic pressure applied to the detection circuit is higher than the predetermined hydraulic pressure.

2. The hydraulic control system according to claim 1, wherein an orifice is provided in the pressure switch circuit.

3. The hydraulic control system according to claim 1, wherein an output pressure from a linear solenoid valve of the automatic transmission is input to the detection circuit.

4. The hydraulic control system according to claim 2, wherein an output pressure from a linear solenoid valve of the automatic transmission is input to the detection circuit.

5. A hydraulic control system for an automatic transmission, comprising:
   a hydraulic detection circuit detecting a hydraulic pressure of a hydraulic circuit;
   an accumulator including a casing, a valve element slidably disposed in the casing, and a spring for biasing the valve element, the valve element dividing the inside of the casing into a first space that communicates with the detection circuit and a second space that houses the spring and communicates with an exhaust circuit;
   a pressure switch for detecting the hydraulic pressure;
   a pressure switch circuit connected to the pressure switch, and connected to a slide section of the casing so as to communicate with the first space at one end; and
   a switching element that communicates with the other end of the pressure switch circuit and the exhaust circuit,
   wherein the valve element closes communication between the pressure switch circuit and the detection circuit when a hydraulic pressure applied to the detection circuit is lower than a predetermined hydraulic pressure, and opens communication between the pressure switch circuit and the detection circuit when the hydraulic pressure applied to the detection circuit is higher than or equal to the predetermined hydraulic pressure, and
   wherein the switching element opens communication between the other end of the pressure switch circuit and the exhaust circuit when the one end of the pressure switch circuit does not communicate with the detection circuit, and closes communication between the other end and the exhaust circuit when the one end communicates with the detection circuit.

6. The hydraulic control system according to claim 5, wherein an orifice is provided in the pressure switch circuit.

7. The hydraulic control system according to claim 5, wherein the valve element includes a disc-shaped head portion and a cylindrical body portion, and the pressure switch circuit is closed by the body portion to close communication of the pressure switch circuit with the detection circuit and the exhaust circuit when the hydraulic pressure applied to the detection circuit is equal to the predetermined hydraulic pressure.

8. The hydraulic control system according to claim 5, wherein an output pressure from a linear solenoid valve of the automatic transmission is input to the detection circuit.

9. The hydraulic control system according to claim 6, wherein an output pressure from a linear solenoid valve of the automatic transmission is input to the detection circuit.

10. The hydraulic control system according to claim 7, wherein an output pressure from a linear solenoid valve of the automatic transmission is input to the detection circuit.

11. A hydraulic control system for an automatic transmission, comprising:
    a detection circuit serving as a part of a hydraulic circuit to detect a hydraulic pressure;
    an accumulator including a casing, a valve element slidably disposed in the casing, and a spring for biasing the valve element, the valve element dividing the inside of the casing into a first space that communicates with the detection circuit and a second space that houses the spring and communicates with an exhaust circuit;
    a pressure switch for detecting the hydraulic pressure;
    a pressure switch circuit connected to the pressure switch, and connected to a slide section of the casing so as to communicate with the first space at one end; and
    a check valve that communicates with the other end of the pressure switch circuit, the detection circuit, and the exhaust circuit, wherein the valve element opens communication between the pressure switch circuit and the exhaust circuit when a hydraulic pressure applied to the detection circuit is lower than a predetermined hydraulic pressure, and opens communication between the pressure switch circuit and the detection circuit when the hydraulic pressure applied to the detection circuit is higher than or equal to the predetermined hydraulic pressure, and wherein the check valve opens communication between the other end of the pressure switch circuit and the exhaust circuit and closes communication between the other end and the detection circuit when the one end of the pressure switch circuit does not communicate with the detection circuit, and closes communication between the other end and the exhaust circuit and opens communication between the other end and the detection circuit when the one end communicates with the detection circuit.

12. The hydraulic control system according to claim 11, wherein an orifice is provided in the pressure switch circuit.

13. The hydraulic control system according to claim 11, wherein an output pressure from a linear solenoid valve of the automatic transmission is input to the detection circuit.

14. The hydraulic control system according to claim 12, wherein an output pressure from a linear solenoid valve of the automatic transmission is input to the detection circuit.

* * * * *